United States Patent [19]

Suzuki

[11] Patent Number: 5,202,769
[45] Date of Patent: Apr. 13, 1993

[54] DIGITAL ELECTROSTATIC PRINTING APPARATUS USING A COUNTED NUMBER OF PIXELS OF VARIOUS DENSITIES TO DETERMINE AND CONTROL AN AMOUNT OF TONER USED DURING IMAGE DEVELOPMENT

[75] Inventor: Tadaomi Suzuki, Kanagawa, Japan

[73] Assignee: Fuji Xerox Co., Ltd., Tokyo, Japan

[21] Appl. No.: 624,636

[22] Filed: Dec. 10, 1990

[51] Int. Cl.$^5$ .............................................. H04N 1/29
[52] U.S. Cl. ............................... 358/300; 346/153.1; 355/208; 355/246
[58] Field of Search ............................. 358/298, 300; 346/153.1, 160; 355/208, 246

[56] References Cited

U.S. PATENT DOCUMENTS

| | | |
|---|---|---|
| 3,529,546 | 9/1970 | Kollar . |
| 4,413,264 | 11/1983 | Cruz-Uribe et al. . |
| 4,847,659 | 7/1989 | Resch, III . |
| 4,908,666 | 3/1990 | Resch, III . |
| 4,974,024 | 11/1990 | Bares .................................. 355/246 |
| 4,987,453 | 1/1991 | Laukaitis ............................ 355/246 |

Primary Examiner—Benjamin R. Fuller
Assistant Examiner—Scott A. Rogers
Attorney, Agent, or Firm—Finnegan, Henderson, Farabow, Garrett and Dunner

[57] ABSTRACT image output apparatus includes a circuit for counting the number of pixels of various color and gradation densities contained in the image data, a circuit for estimating, based on the counted number, the amount of toner that will be consumed during development of the image data; and a circuit and rollers of an controlling based on the estimated amount the actual a mount of toner supplied for developing the image.

5 Claims, 4 Drawing Sheets

DIGITAL ELECTROSTATIC PRINTING APPARATUS USING A COUNTED NUMBER OF PIXELS OF VARIOUS DENSITIES TO DETERMINE AND CONTROL AN AMOUNT OF TONER USED DURING IMAGE DEVELOPMENT

BACKGROUND OF THE INVENTION

1. Field of the Invention

This invention relates to a digital image output apparatus for forming a multi-gradation image, and more particularly to a multi-color, multi-gradation digital image output apparatus including a unit for controlling a toner supply amount so that the toner density or toner amount at the developers of the respective colors can be maintained at an optimal value.

2. Discussion of the Related Art

The binary developer, composed of toner and its carrier, that is used in electrostatic copying machines or electrostatic printers of the electrophotographic type impairs the quality of images when the toner density, i.e., the mixing ratio of the carrier and the toner, is altered. Thus, it is necessary to maintain the toner density in the developer at a constant irrespective of output conditions such as the number of output copies and output image density. Further, when a one-component developer is used, the amount of developing agent at the developer, i.e., the amount of toner, must be maintained at a constant. For this reason, a toner supply amount control unit is used so that the amount of toner to be supplied to the developers can be adjusted by controlling toner dispensing motors in accordance with the density of the image to be output which is detected in advance.

In prior art optical electrostatic copying machines, the control of toner supply to a developer involves prescanning a document, checking an average density using an optical sensor, and controlling the toner dispensing motors in accordance with the obtained average density This type of toner supply amount control unit, involving the prescanning of a documents, uses the average density of the document as a control parameter. However, the average density is not in strict correspondence with the amount of toner to be consumed, and as a result, the toner supply amount obtained based on the average density is not optimal.

Also, of recent use are digital copying machines in which a document image is read by a CCD (charge coupled device) sensor. In such digital copying machines, the read signals are converted to digital video signals, and the image is output after subjecting the digital video signals to a predetermined image processing. In order to use the above-described toner supply amount control unit in such digital copying machines, a document density detection sensor is required in addition to the regular image reading CCD sensor, thereby making the machines expensive.

Thus, a toner supply amount control unit for the prior art digital copying machines, digital printers, etc. is designed to control the toner supply amount by recognizing that the image data contains density data of the document image.

That is, the digital image output unit counts the black bits in serially transmitted image data, e.g., the number of high-level bits, and the dispensing motors are controlled based on the obtained counts. Generally, the image data applied to the digital image output unit is binary data in which density data amount per pixel is 1 bit. Therefore, the number of bits substantially corresponds to the density, thereby allowing the toner density to be properly adjusted as long as the toner supply amount is controlled in accordance with the number of bits.

However, if this method is applied to an image output apparatus outputting multi-valued image data, e.g., gradation data having density data amount per pixel of 2 bits, accurate toner supply amount control can not be performed The reason is as follows. For example, if the density data amount per pixel consists of 2 bits, gradation data takes four values corresponding to respective densities as shown in Table 1. Here, it is supposed that the relationship "white"<"gray 1"<"gray 2"<"black" exists.

TABLE 1

| Density | Data |
| --- | --- |
| White | 00 |
| Gray 1 | 01 |
| Gray 2 | 10 |
| Black | 11 |

If such data is transmitted serially and the number of highlevel bits, i.e., data "1," is counted, the results are 1 for "gray 1"; 1 for "gray 2"; and 2 for "black." Unlike the binary data, these counts have no correspondence with the toner consumption amount. For example, if the densities of contiguous pixels are "white," "gray 1," "gray 1," and "black," the image data of this particular portion of pixels is expressed as "00010111" and the bit count becomes 4. However, in the case of an array of pixels consisting of "white" "gray 2" "gray 2" and "black", which consumes more toner than the above example, the image data is expressed as "00101011" and the bit count is the same as before, i.e., 4. Thus, the toner consumption cannot be predicted correctly with this method.

In order to avoid such a shortcoming, an actual digital image output unit receives the image data in parallel and in synchronism with a pixel clock, and sets a threshold between, e.g., "gray 1" and "gray 2" to count the number of pixels whose densities excess this threshold However, the introduction of such a threshold parameter results in counting both pixels of "gray 2" and "black" as the same value, although the amount of toner consumed by them is different. Thus, this method is not satisfactory in performing accurate toner density control.

SUMMARY OF THE INVENTION

The present invention has been made in view of the above circumstances and has an object of providing a multigradation digital image output apparatus capable of accurately detecting the toner consumption amount to thereby control the toner density in a developer to an optimal value at all times so that the reproduced image is always satisfactory.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein the invention comprises an image output apparatus using toner for forming an image of pixels of various gradation densities, the apparatus comprising means for counting the number of pixels of the various gradation densities contained in the image data, means for estimating based on the counted number the amount of toner that will be consumed during development of the image data, and means for controlling based on the estimated amount the actual amount of toner supplied for developing the image.

BRIEF DESCRIPTION OF THE DRAWINGS

The accompanying drawings, which are incorporated in and constitute a part of this specification illustrate several embodiments of the invention and, together with the description, serve to explain the objects, advantages and principles of the invention.

In the drawings.

DETAILED DESCRIPTION OF THE PREFERRED EMBODIMENTS

Embodiments of the present invention will be described with reference to the accompanying drawings.

The image output apparatus of this invention basically comprises means for forming a latent electrostatic image on a photoreceptor according to multigradation digital image data, a developer for developing the latent electrostatic image with toner, and means for supplying the toner to the developer; and further comprises, according to the invention, a counter circuit for counting the number of pixels contained in the multigradation digital image data for each density gradation, means for calculating a toner consumption amount from the number counted by the counter circuit, and means for controlling the amount of toner to be supplied by the toner supplying means in accordance with the calculated toner consumption amount.

The number of pixels of each density can be counted on a color basis and on a page basis as well.

According to the present invention, the number of pixels contained in a multigradation digital video signal is counted on a density gradation basis, and as a result, the toner consumption amount is calculated using a predetermined equation Since the multigradation density is taken into consideration accurately in the calculated toner consumption amount, the supply of toner in accordance with this calculated toner consumption amount allows the toner density or toner amount at the developer to be maintained constant at all times.

Figure 1:
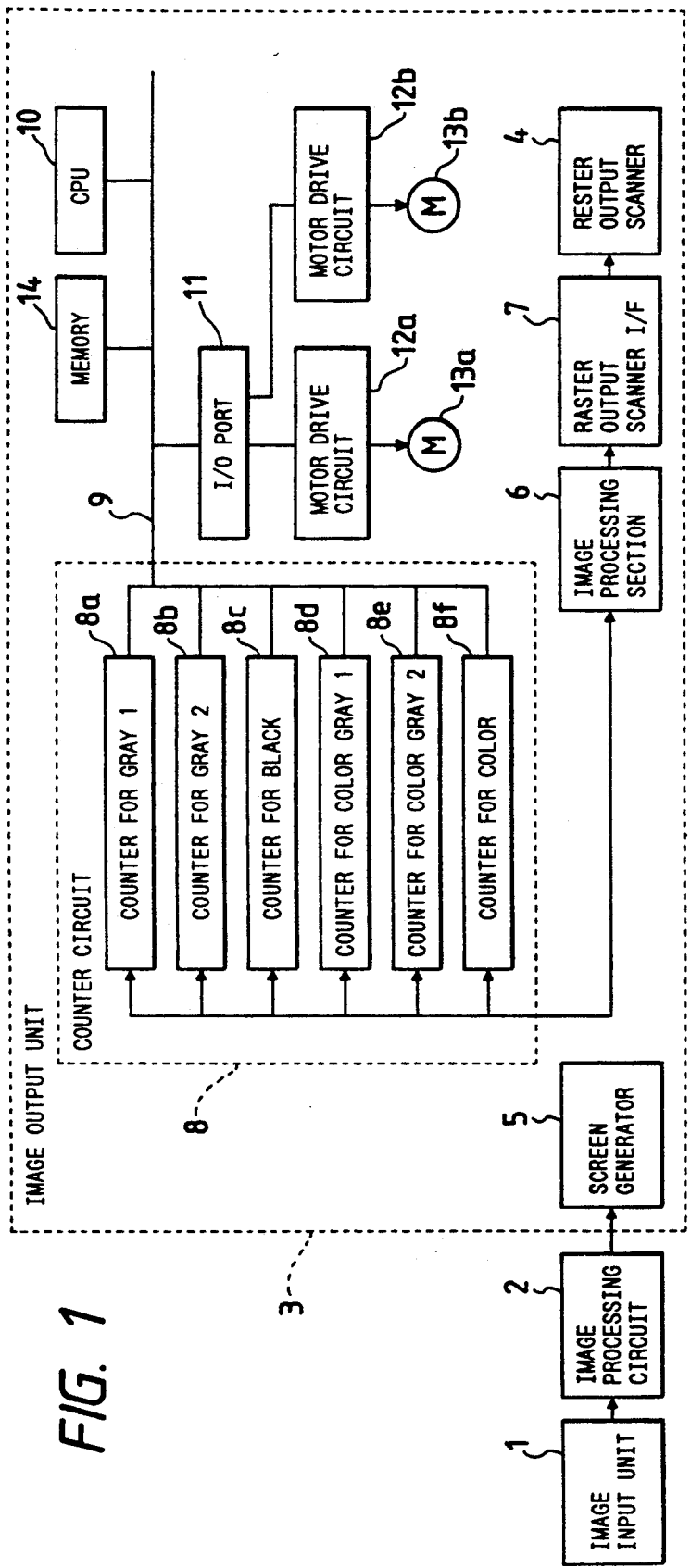
FIG. 1 is a block diagram showing an embodiment of a digital image output apparatus of the present invention.

FIG. 1 is a block diagram of a multigradation, multicolor digital copying machine to which a digital image output apparatus of the present invention is applied.

An image input unit 1 includes a scanning section (not shown) which reads an image with color separation while scanning a document placed on a transparent platen Analog video signals from image input unit 1 are applied to an image processing circuit 2, where the applied analog video signals are converted to digital video signals, and density data representing the document density in 8 bits per pixel for each color are output. In this embodiment, image data is formed by adding to the density, data bits such as a color identification (ID) bit indicating the type of color and is applied to an image output unit 3.

Image output unit 3 includes, e.g., a raster output scanner 4 (ROS) which forms a latent electrostatic image by imagewise scanning a photoreceptor with a laser as a light source. ROS 4 receives the image data from image processing circuit 2 through a screen generator 5, an image processing section 6, and an ROS interface 7. The output of screen generator 5 is applied to a counter circuit 8 for detecting the density of the document image. Counter circuit 8 is made up of a plurality of counters 8a through 8f, each of which detects the density of the document image for each color and density gradation. To detect each of black and one other color in 4 gradations, there are provided counter 8a for "gray 1," counter 8b for "gray 2," counter 8c for "black," counter 8d for "color gray 1," counter 8e for "color gray 2," and counter 8f for "color "It is supposed that the relationship "color gray 1"<"color gray 2"<"color" exists for color density.

The detailed construction of each counter will be described with reference to FIG. 2, taking counter 8c for "black" as an example.

In accordance with the invention, an image output apparatus comprises means for counting the number of pixels of the various gradation densities contained in the image data. As embodied herein, the counting means comprises an AND circuit 81 and an inverter 82. Two-bit density data D1 and D2 applied from screen generator 5 to AND circuit 81. and 1-bit color ID bit Dc applied to AND circuit 81 after being inverted by inverter B2.

The output of AND circuit 81 is applied to the enable terminal of a counter 83. A pixel clock signal, which is generated every time image input unit 1 reads a pixel, is fed to the clock input terminal of counter 83. The output of counter 83 is then applied to a gate 85. Upon reception of a read signal from a CPU 10 by the output enable terminal of gate 85, a content of counter 83 is read by CPU 10 through a CPU bus 9, and CPU 10 calculates a toner supply amount in accordance with the content of the counter 83. Based on this calculated toner supply amount, the time for rotating toner dispensing motors 13a and 13b provided at the developer for each color is controlled through an I/O port 11 and motor drive circuits 12a and 12b.

Figure 3:
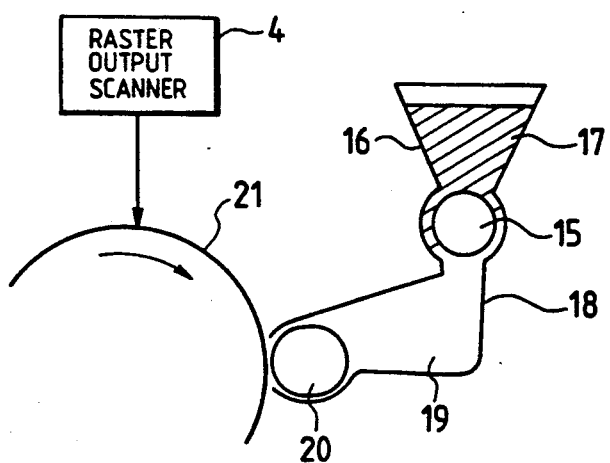
FIG. 3 is a schematic drawing illustrating the operation of controlling a toner supply amount.

Toner dispensing motors 13a and 13b serve to control the amount of toner to be supplied to the developer of each color For example, the rotation of toner dispensing motor 13a is transmitted to a toner dispensing roller 15 shown in FIG. 3, and the rotation of the toner dispensing roller 15 causes toner 17 in a toner tank 16 to be supplied to a housing 19 of a developer 18. The rotation of a developing roller 20 then causes toner 17 to be forwarded to the surface of a photoreceptor 21 The same operation is performed by the developer of another color which is provided with toner dispensing motor 13b.

A nonvolatile memory 14, connected to CPU bus 9, contains such data as necessary to control the rotation of toner dispensing motors 13a and 13b.

The operation of the above digital copying machine will now be described.

A video signal produced by reading the document at image input unit 1 is converted to image data consisting of 8-bit density data and a 1-bit color ID bit by image processing circuit 2. The image data is fed to screen generator 5 to be further converted to, e.g., 4-gradation density data consisting of 2 bits per pixel in accordance with characteristics of image output unit 3. Image output unit 3 has a plurality of output characteristics so that the output density can be adjusted in accordance with image quality requirements. The density data is output with the color ID bit and other bits Table 2 shows exemplary output data from screen generator 5.

TABLE 2

| Pixel | Density data | | ID bit |
|---|---|---|---|
| | D2 | D1 | Dc |
| White | 0 | 0 | 0 |
| Gray1 | 0 | 1 | -0 |
| Gray2 | 1 | 0 | 0 |
| Black | 1 | 1 | 0 |
| Color gray | 0 | 1 | 1 |
| Color gray | 1 | 0 | 1 |
| Color | 1 | 1 | 1 |

These data are output in parallel in synchronism with the pixel clock.

Counter circuit 8, which receives these data, calculates the number of pixels for each color and density gradation. For example, if a pixel is "black," its density data D2 and D2 is "11" and its color ID bit Dc is "0." Hence, all the inputs at AND circuit 81 are at H-level, thereby making counter 83 ready to operate. Thus, counter 83 is incremented in synchronism with a pixel clock and the number of black pixels is counted.

Figure 2:
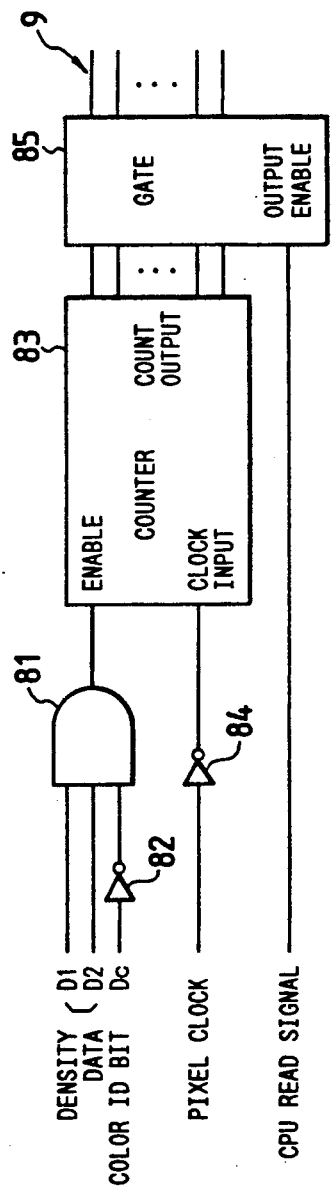
FIG. 2 is a block diagram showing the detailed construction of a counter circuit used in the digital image output apparatus shown in FIG. 1.

Although only the counter for counting the black pixels is shown in FIG. 2, a counter for counting pixels of other colors and density gradations may be constructed by modifying the configuration of a logic circuit connected to the enable terminal of counter 83. That is, a plurality of counters may be provided so that the enable terminal of each logic circuit becomes H-level when density data D2 and D1 and color ID bit Dc have values as shown in Table 2. For example, for a counter for "color gray 2," a logic circuit is constructed so that density data D2 and color ID bit Dc will be applied to AND circuit 81 directly and density data D1 will be applied through inverter 82. Counting is performed on a page basis.

Upon the data input end of one page, CPU 10 reeds the count of each of counters 8a through 8f to identify how many pixels are present for each color and density gradation within the page. CPU 10 then calculates a toner consumption amount per color based on these counts.

For example if the counts for "gray 1," "gray 2," and "black" are A, B, and C, respectively, and the pixels of "gray 1" and "gray 2," will consume 2/5 and 4/5 of the toner amount consumed by the "black" pixel, a toner consumption amount (Cr) formula for the page as follows:

$$Cr = A \times 2/5 + B \times 4/5 + C \ldots \quad (1)$$

The consumption amount of a color toner can likewise be obtained.

Figure 4:
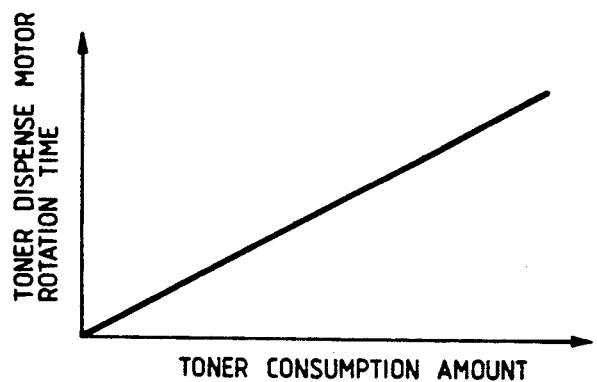
FIG. 4 is a graph showing the relationship between the calculated toner consumption amount and the toner dispensing motor operation time.
Figure 5:
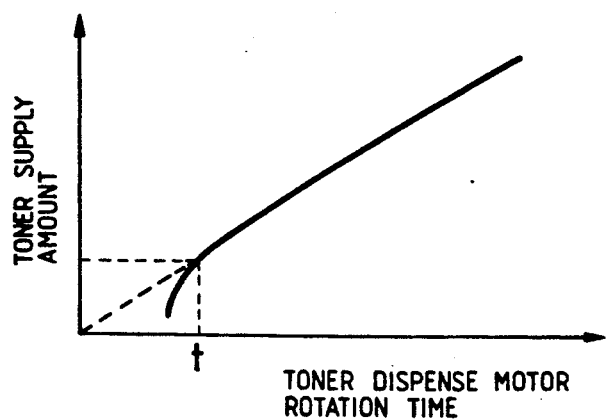
FIG. 5 is a graph showing the relationship between the actual toner supply amount and the toner dispensing motor operation time.

In accordance with the invention, an image output apparatus comprises means for controlling, based on the estimated toner amount, the actual amount of toner supplied for developing the image. As embodied herein, the controlling means comprises CPU 10 controlling toner dispensing motors 13a and 13b based on the calculated toner consumption amount for the page. CPU 10 converts the toner consumption amount to a motor rotation time for control of motors 13a and 13b. That is, as shown in FIG. 4, the larger the calculated toner consumption amount is, the longer the motor rotation time becomes. The toner consumption amount is converted to the motor rotation time by, e.g., referencing a conversion table prepared in advance in memory 14. However, the motors, which are mechanical parts, require a certain time before their rotational speed reaches a steady state. That is, driving the motor for a fraction of time may cause no toner supply or, if some, only an insufficient amount of toner may be supplied. As shown in FIG. 5, the relationship between the motor rotation time and the toner supply amount is not perfectly linear if the motor is rotated only for a time t or less.

Figure 6:
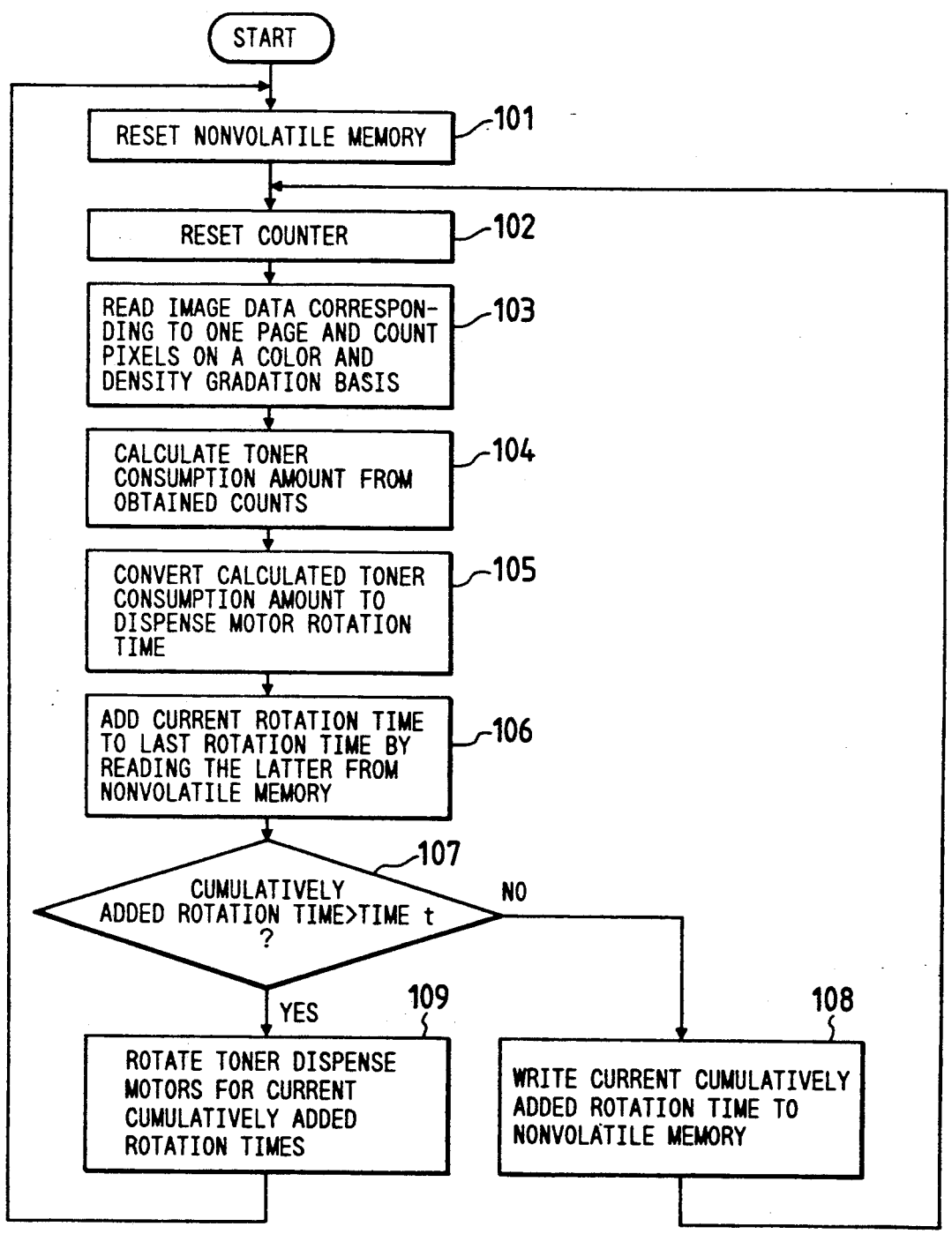
FIG. 6 is a flow chart illustrating the operation of controlling the toner supply amount.

Thus, CPU 10 controls the toner supply amount only using the linear portion in the relationship between the motor rotation time and the toner supply amount. That is, CPU 10, as shown in the flow chart of FIG. 6, resets nonvolatile memory 14 and counter circuit 8 (Steps 101 and 102), and then reads image data corresponding to one page of document and counts pixels on a color and density gradation basis with counters 8a through 8f (Step 103). From such counts, CPU 10 then calculates not only the toner consumption amount for each color using equation (1) (Step 104), but also the times for rotating toner dispensing motors 13a and 13b (Step 105). Then, CPU 10 calculates the cumulatively added rotation time by adding the currently obtained rotation time to the content of nonvolatile memory 14, i.e., "0" for a first time, and then the preceding rotation time from a second time on (Step 106). When the cumulatively added rotation time is below time t (Step 107), CPU 10 returns to Step 102 after writing the current cumulatively added rotation time in nonvolatile memory 14 (Step 108). When the current cumulatively added rotation time reaches time t at which the relationship between the motor rotation time and the toner supply amount turns linear, CPU 10 causes toner dispensing motors 13a and 13b to rotate for the current cumulatively added rotation times (Step 109) and returns to step 101 after supplying a predetermined amount of toner to the developer.

According to the above operation, each developer is supplied with toner in an amount accurately equivalent to the amount of toner consumed during the image forming operation, thereby maintaining the toner density at each developer constant at all times. Therefore, an image of optimal density can be formed on photoreceptor 21 during the development process.

On the other hand, photoreceptor 21 of FIG. 3 is charged in advance by a charging device (not shown), and is exposed using laser light to produce a latent electrostatic image thereon. The latent electrostatic image is developed with toner when it reaches the position of developer 18. Since the appropriate amount of toner has already been supplied at this point of time in accordance with the density of the image to be developed, the development is performed in the state of constant toner density, and therefore an image having optical density can be formed on photoreceptor 21.

Another embodiment of the present invention will now be described with reference to FIG. 7. Like reference numerals designate corresponding parts and components in FIG. 1 and their descriptions will be omitted.

Figure 7:
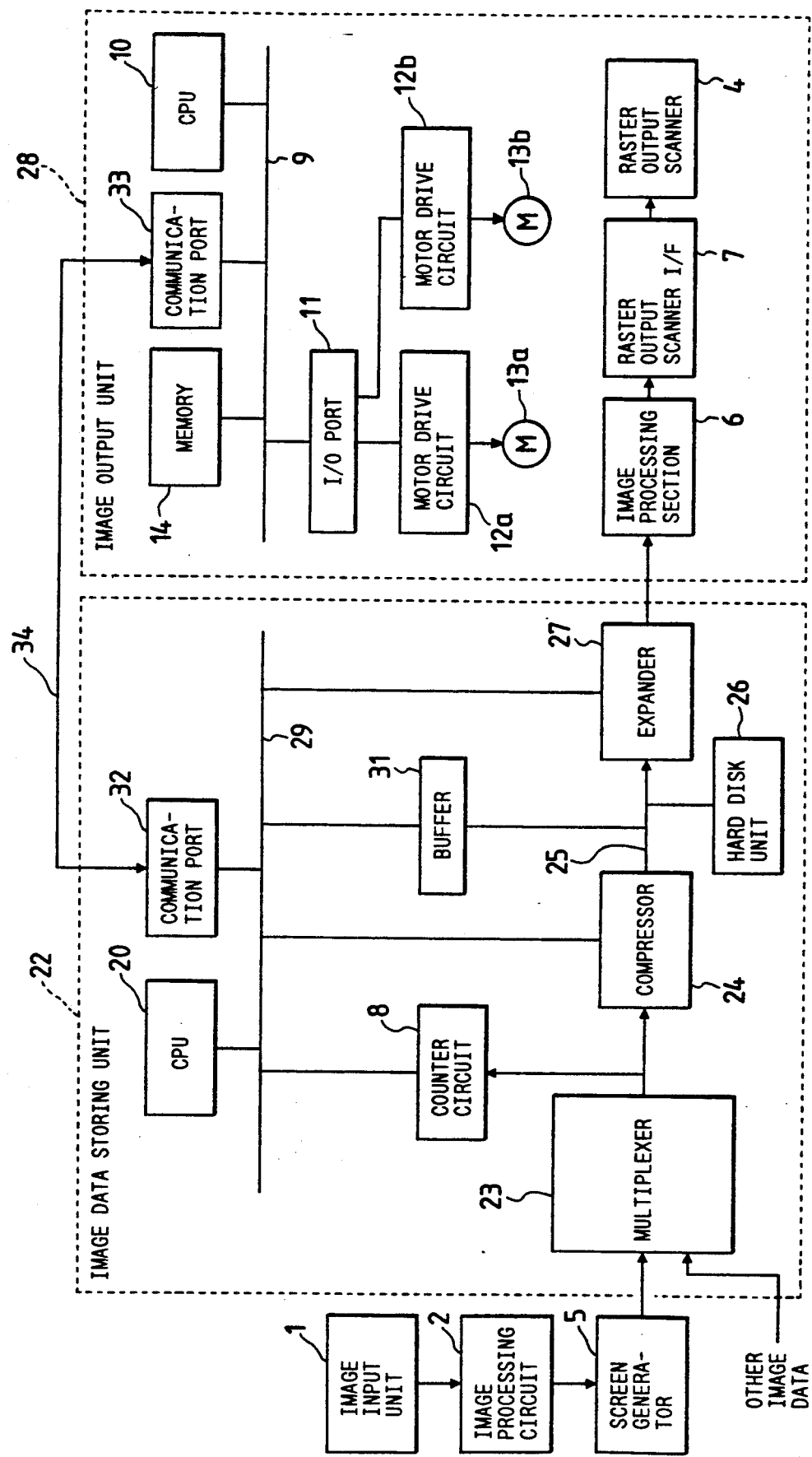
FIG. 7 is a block diagram showing another embodiment of a digital image output apparatus of the present invention.

In an embodiment shown in FIG. 7, image input unit 1 includes an automatic document handler (not shown) so that a plurality of document pages can continuously be read automatically every page. Image data read from image input unit 1 on a single page basis is applied to a video data storing unit 22 through image processing circuit 2 and screen generator 5. At image data storing unit 22, the image data is applied to a compressor 24 through a multiplexer 23, thereby reducing its data volume, and then is written sequentially to a hard disk unit 26 via an image data bus 25 on a single page basis. In this case, the image data is transmitted to an expander 27 from a compressor 24 simultaneously with its transmission to hard disk unit 26 thereby to the compressed video data is recovered to yield the original image data, and then applied to an image output unit 28. A first set of copies are output by this operation. Further, multiplexer 23 receives image data from other image data sources such as a computer or a facsimile machine, and thus a plurality of types of image data are stored in hard disk unit 26.

For the output of a second set of copies, and for further sets, image data is read from hard disk unit 26 on a single page basis and provided to expander 27 to obtain the original image data, and the expanded image data is applied to image output unit 28. The image data is read from hard disk unit 26 in such a sequence as to maximize the efficiency, in view of image input and output conditions of the image data.

Compressor 24 and expander 27 are connected to CPU 20 through a CPU bus 29, and between CPU bus 29 and an image data bus 25 is a buffer 31 connected for allowing data transfer therebetween. Further, communication ports 32 and 33 are connected to CPU bus 29 at image data storing unit 22 and CPU bus 9 at image output unit 28, respectively, so that data can be communicated between image data storing unit 22 and image output unit 28 through communication line 34.

Further, the image data from screen generator 5 is applied, in the same manner as shown in FIG. 1, to counter circuit 8 in order to count the number of pixels for each color and density gradation. The counting operation is performed on a single page basis.

Upon the end of the input of a page, CPU 20 reads the count in each of counters 8a through 8f (see FIG. 1) in counter circuit 8 and calculates the toner consumption amount and then the motor rotation times for toner dispensing motors 13a and 13b. Thereafter, the cumulatively added toner dispensing motor rotation time is read from nonvolatile memory 14, and when time t has passed, CPU 20 transmits a command to rotate toner dispensing motors 13a and 13b through communication line 34. CPU 10 at image output unit 28 analyzes this command applied through communication line 34, and, if it is a command to rotate toner dispensing motors 13a and 13b, CPU 10 rotates motors 13a and 13b for a predetermined time by motor drive circuits 12a and 12b.

Accordingly, similar to the embodiment shown in FIG. 1, the toner density at each developer can be maintained constant through proper control of the toner supply amount.

If the image data is stored in hard disk unit 26, as in the case of the embodiment shown in FIG. 7, data such as toner dispensing motor rotation times, various reference tables, and other parameters may be contained in hard disk unit 26 instead of storing them in nonvolatile memory 14. In this case, nonvolatile memory 14 is no longer necessary.

While the toner supply amount is adjusted by controlling the toner dispensing motor rotation time in the above embodiments, the application of the present invention is not limited thereto, but may, e.g., be such that drive time of an oscillating member or vibrating member to feed the toner is controlled.

While the digital image output apparatuses having two developers are taken as examples for the description of the embodiments, the present invention may of course be applied to a digital image output apparatus having three or more developers.

As described in the foregoing pages, the number of pixels is counted for each graduation and based on the counts, the toner consumption amount is calculated. The toner is supplied in accordance with the toner consumption amount. Accordingly, the toner can be supplied in amount exactly in correspondence to the actually consumed about which depend on the density of the output image, thereby maintaining the toner density of developer at an optimal value. Hence, the density of a toner image to be formed on the photoreceptor is appropriate, thus producing a high-quality output image.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application in order to enable one skilled in the art to utilize the invention in various embodiments and with various modifications as are suited to the particular use contemplated. It is intended that the scope of the invention be defined by the claims appended hereto, and their equivalents.

What is claimed is:

1. An image output apparatus using toner for developing an image formed from pixels of various gradation densities, wherein the image is represented by digital data and each pixel has an associated gradation density value and color value, the apparatus comprising:
   means for counting pixels of the various gradation densities contained in the image data to produce a counted number, wherein the counting means counts on an basis of both a gradation density value and a color value;
   means for estimating, in accordance with the counted number, an amount of toner that will be consumed during development of the image data; and
   means for controlling, in accordance with the estimated amount, an actual amount of toner suplied for developing the image.

2. The apparatus as claimed in claim 1 wherein said digital image data is represented as image pages and wherein said means for counting counts one page of pixels at a time.

3. An image output apparatus using toner for developing an image formed from pixels of various gradation densities, the apparatus comprising:

means for counting pixels of the various gradation densities contained in the image data to produce counted number, wherein the counting means comprises a counter for the pixels which are black, a counter for the pixels which are a first shade of grey, and a counter for the pixels which are a second shade of grey;

means for estimating, in accordance with the counter number, an amount of toner that will be consumed during development of the image data; and means for controlling, in accordance with the estimated amount, an actual amount of toner supplied for developing the image.

4. The apparatus as claimed in claim 3 wherein the counting means further comprises a counter for the pixels which are a color, a counter for the pixels which are a first shade of the color, and a counter for the pixels which are a second shade of the color.

5. The apparatus as claimed in claim 3 wherein the apparatus includes a toner dispensing motor, and wherein the controlling means selectively sets an operation time of the motor based on the estimated amount of toner.

* * * * *

UNITED STATES PATENT AND TRADEMARK OFFICE
CERTIFICATE OF CORRECTION

PATENT NO. : 5,202,769
DATED : April 13, 1993
INVENTOR(S) : Tadaomi Suzuki

It is certified that error appears in the above-indentified patent and that said Letters Patent is hereby corrected as shown below:

Abstract, Front Page, line 1, change "image" to --An image--.

Abstract, Front Page, line 6, delete "of an" insert --for--.

Abstract, Front Page, line 7, change "a mount" to --amount--.

Claim 1, column 8, line 65, change "suplied" to --supplied--.

Claim 3, column 9, line 10, after "produce" insert --a--.

Claim 3, column 10, line 1, change "counter" to --counted--.

UNITED STATES PATENT AND TRADEMARK OFFICE
CERTIFICATE OF CORRECTION

PATENT NO. : 5,202,769
DATED : April 13, 1993
INVENTOR(S) : Tadaomi Suzuki

It is certified that error appears in the above-indentified patent and that said Letters Patent is hereby corrected as shown below:

Claim 3, column 10, line 1, change "counter" to --counted--.

Signed and Sealed this

First Day of November, 1994

Attest:

Attesting Officer

BRUCE LEHMAN

Commissioner of Patents and Trademarks